United States Patent [19]

Giebler et al.

[11] 4,143,980

[45] Mar. 13, 1979

[54] SHIFTING ARRANGEMENT FOR EXACT SPACE POSITIONING OF A WRITING CARRIAGE IN TYPEWRITERS

[75] Inventors: Fritz Giebler, Munich; Oskar Hötzel, Neuried, both of Fed. Rep. of Germany

[73] Assignee: Siemens Aktiengesellschaft, Berlin & Munich, Fed. Rep. of Germany

[21] Appl. No.: 769,563

[22] Filed: Feb. 17, 1977

[30] Foreign Application Priority Data

Mar. 3, 1976 [DE] Fed. Rep. of Germany ....... 2608754

[51] Int. Cl.² ............................................. B41J 19/00
[52] U.S. Cl. .................................... 400/322; 400/320; 400/903; 318/685; 318/696
[58] Field of Search ................. 197/82; 318/621, 685, 318/696

[56] References Cited

U.S. PATENT DOCUMENTS

| 3,541,418 | 11/1970 | Agin et al. ........................ 318/685 X |
| 3,554,347 | 1/1971 | Perkins ........................... 197/82 UX |
| 3,586,953 | 6/1971 | Markkanen et al. ................ 318/685 |
| 3,748,566 | 7/1973 | Brembs ........................... 318/685 |
| 3,950,685 | 4/1976 | Kramer ........................... 197/82 X |
| 3,986,094 | 10/1976 | Quioque et al. ..................... 318/696 |
| 3,991,355 | 11/1976 | Reehil et al. ....................... 318/696 |
| 4,004,672 | 1/1977 | Hirano et al. ...................... 197/82 X |

Primary Examiner—Ernest T. Wright, Jr.
Attorney, Agent, or Firm—Hill, Gross, Simpson, Van Santen, Steadman, Chiara & Simpson

[57] ABSTRACT

A shifting arrangement is provided for the exact space positioning of a writing carriage for office, teletype or data typewriters in which the writing carriage is moved step-by-step alongside of a record structure in accordance with a predetermined character positioning pattern. The writing carriage is driven by a stepping motor which has a rotary field. A specific number of angle positions of the stepping motor field serve as basic advance positions of the stepping motor in order to compensate for the load angle of the stepping motor during running of the writing carriage. Such basic advance positions are assigned to each character positioning point of the positioning pattern. An electronic device is provided for triggering the rotary field of the stepping motor and automatically adjusting this rotary field to the corresponding basic advance position during running and setting the field to a rest position during stopping of the stepping motor in order to correct for the stepping motor load angle.

3 Claims, 2 Drawing Figures

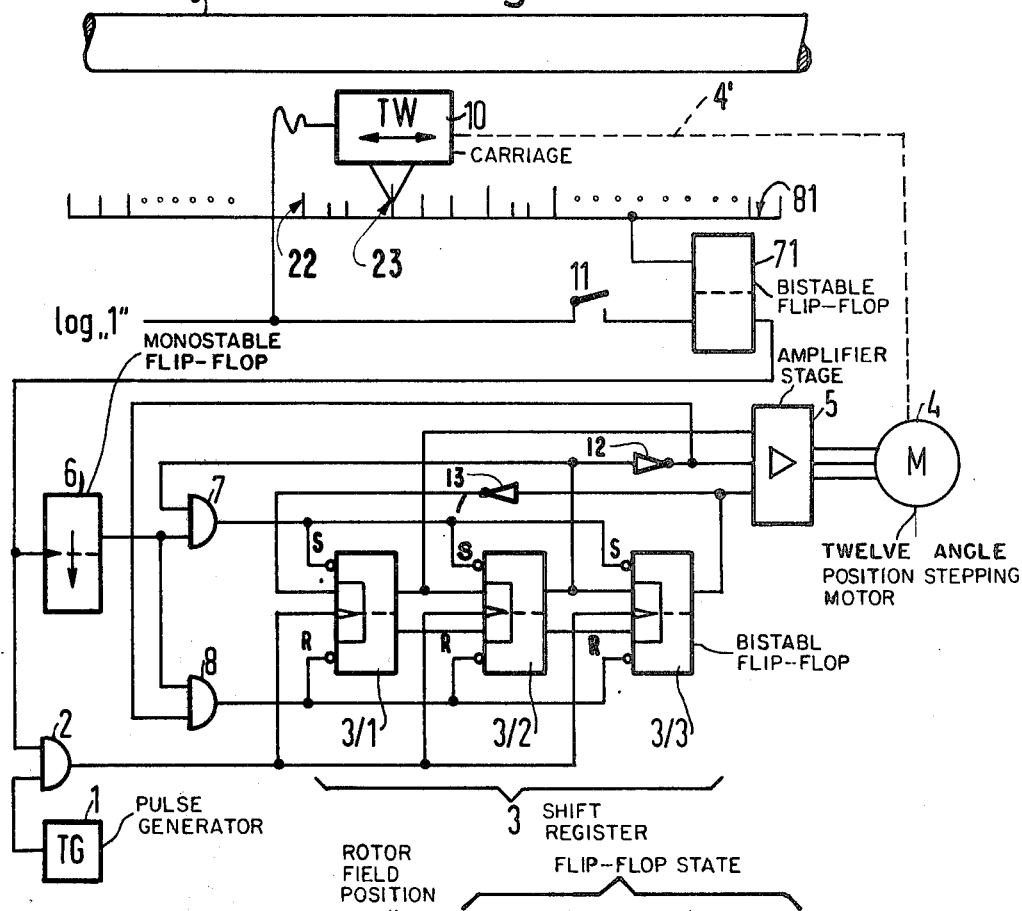

SHIFTING ARRANGEMENT FOR EXACT SPACE POSITIONING OF A WRITING CARRIAGE IN TYPEWRITERS

BACKGROUND OF THE INVENTION

The invention relates to a shifting arrangement for the exact space positioning of a writing carriage in tele- or data typewriters in which the writing carriage is moved alongside of a record holder with the aid of a stepping motor.

Generally, the writing carriage in tele- or data typewriters is moved alongside of a record holder for each line with the aid of a driving device according to pulses of a positioning pattern. Such a positioning pattern denotes the distance between the individual characters in a printed line. Due to the gradual advance needed, stepping motors are particularly suited as driving means since they can be digitally triggered in simple fashion via counting devices. When loading of the stepping motor occurs between the rotary field and the armature driving the writing carriage, an angle displacement, the so-called load angle results, thus requiring special techniques for triggering the stepping motor.

In a related case, German Offenlegungsschrift No. 1,563,019 (having no U.S. corresponding application), a method and an arrangement for stepping of electrical stepping motors is described in which the rapid execution of step-like rotary motions of motors with subsequent overshot-free stopping is performed. The field winding of the electrical stepping motor is successively excited with a sequence of impulses whose length and amplitude are adjusted to the rotary motion in such a manner that the stepping motor driver lags behind the exciter field in the acceleration period, runs ahead of the exciter field in the subsequent deceleration period, and is finally stopped by the exciter field in the rest position until the beginning of the next step-like rotary motion.

SUMMARY OF THE INVENTION

It is an object of the invention to provide a shifting arrangement for a stepping motor with which it is possible to stop the motor exactly at specific angle positions while taking into consideration the load angle.

In accordance with the invention, for every positioning point of the positioning pattern a specific number of angle positions of the stepping motor are assigned which serve as basic advance positions of the stepping motor. An electronic device is also provided for actuating the rotary field of the stepping motor which automatically positions the rotary field to the next basic advance position when the stepping motor is running and to a rest position when the motor is stopped.

In a particularly advantageous embodiment of this invention, the number of the basic advance positions is determined by the quotient of the number of rotary field positions of the stepping motor divided by the number of individual steps of the stepping motor corresponding to a pattern advance step. This is explained below.

In a further embodiment of the invention the electronic device consists of a counting device with a counter positioning device connectible via a switching device when a stop signal is present for the stepping motor.

Such a switching arrangement has the important advantage that depending upon the positioning pattern, a writing carriage driven by the stepping motor can be precisely stopped. Upon reaching the stopping point, the rotary field, which is already ahead due to the load angle, is triggered or set back to the closest rest position. The switching arrangement triggering the stepping motor is designed in such a manner that the stepping motor can only be stopped at the possible stop or rest positions assigned to the pattern. Accordingly an electronic stop or rest is formed parallel to the mechanical position pattern. During stopping, the rotary field is adjusted to the closest rest position, i.e., in the corresponding design of the switching arrangement this is in each case the last rest position crossed.

In a further development of the invention a Johnson counter is used as a counting device resulting in a particularly simple creation of the rotary field, such that a derivation of the rest position is possible.

BRIEF DESCRIPTION OF THE DRAWING

FIG. 1 illustrates a block circuit diagram of a trigger device of this invention for a stepping motor driving a type carrier or carriage with printing type thereon alongside of a line to be printed; and FIG. 2 illustrates a condition table for a stepping motor triggering process of this invention.

DESCRIPTION OF THE PREFERRED EMBODIMENTS

A carrier or carriage 10 with printing type is transported alongside of a printing surface on a record holder 9 by means of a stepping motor 4 connected to carriage 10 by mechanical means 4' shown in dotted lines, and according to a positioning pattern 81 having a cell or increment width between characters (such as between 22 and 23) which is determined by the width of the characters to be written. The occupation of a rest or stop position such as 22 or 23 adjacent the location of a character to be printed within the positioning pattern 81 shown in FIG. 1 can be read via a scanning device (not shown). The driving device for the type carrier 10 is particularly appropriate for use with a matrix printing mechanism arranged on the type carrier 10. In matrix printing, a character may be formed of a plurality of ink dots arranged according to the shape of the character. Such character formation occurs during advancing of the carriage 10. (In contrast thereto, advancing of the carriage in simple printing mechanisms takes place between the character printing phases and not during the actual character printing.) The triggering of the matrix printing mechanism is considerably simplified if the velocity of the type carrier 10 is constant and does not vary during the advance which occurs during the printing of a character. However, achievement of such a constant velocity is dependent upon the so-called load angle occurring in the stepping motor 4. The magnetic field which is to be stepped is ahead of the rotor by this load angle. Since the magnetic field occupies an advance position upon reaching the respective rest position in order to obtain a uniform velocity, the rotary field has to be again reset in order to insure occupation of the rotor in the rest position. A trigger circuit of this invention for the stepping motor 4 meets this requirement.

The stepping pulse for the stepping motor 4 is produced in a pulse generator 1. If the switch 11 is set for a character in order to permit the printing process, then a bi-stable flip-flop 71 is set in such a manner that the stepping pulse is conveyed to a shift register 3 formed of bi-stable flip-flops 3/1, 3/2, 3/3 via an AND gate 2. The output of the last shift register step 3/3 is coupled in inverted fashion by inverter 13 to the input of the first shift register step 3/1 so that the function of a so-called Johnson counter results. Such a Johnson counter causes a stepping of the individual steps, as determined from columns 3/1, 3/2, 3/3 of FIG. 2. The output of the second shift register step 3/2 is inverted by inverter 12 so that the pattern formed by the columns 5/1, 5/2, 5/3 of FIG. 2 results. This pattern is conveyed to the stepping motor 4 via the amplifier stage 5 in order to step the motor 4.

The steps 3/1, 3/2, 3/3 of the shift register 3 are set or reset into a position occupying equal states after completion of the individual advance processes with the aid of a resetting means including a monostable flip-flop 6 and two AND gate logic elements 7, 8. These starting positions correspond to the setting or position pattern 81 of the type carriage 10. When the type carriage 10 reaches a pattern mark such as 22 or 23 of the pattern 81 wherein the rotor of the stepping motor 4 indeed has attained the desired rest position but the magnetic field is stepped up via the flip-flops 3/1, 3/2, 3/3 of the shift register 3 to create the required load angle, the rotary field is turned back to one of the starting positions. Accordingly, the shift register 3 occupies at the turn-off point (before resetting of the field) the condition pattern illustrated on line 2 or on line 5 of the table of FIG. 2 (basic advance positions). However, the shift register 3 has to be corrected to the condition pattern of line 1 which is the same as the pattern of line 7, or into the pattern of line 4 (rest positions). The edge of the pulse appearing in the course of setting back the bi-stable flip-flop 71 for this purpose triggers the monostable flip-flop 6 which applies a passage potential to the two AND gate elements 7, 8. The respective second inputs of the two AND gate elements 7, 8 are triggered by the output of the second register step 3/2 of the shift register 3 directly at the AND gate element 7, and at the AND gate element 8 with the output of the second register step 3/2 after an inversion. Thus, depending upon the situation, a trigger signal at the output of the second shift register 3/2 is present either at the output of the AND gate element 7 or at the output of the AND gate element 8. This trigger signal is conveyed to the set inputs S or the reset inputs R for each of the steps 3/1, 3/2, 3/3 of the shift register 3 and sets these steps 3/1, 3/2, 3/3 directly into the condition position of the second shift register step 3/2. Thus, the required triggering correction for the magnetic field is achieved.

To explain in a somewhat different fashion, in the switching arrangement of this invention illustrated in FIG. 1, a step pulse is conveyed to a three-step Johnson counter 3 via an AND gate 2 depending upon the position of the writing carriage 10 in FIG. 1. Such a Johnson counter is described in Texas Instrument Application Report, Bulletin 102, December, 1969, and is a shift register in which the output of the last stage is fed back in inverted fashion to the input of the first stage. Here, the Johnson counter 3 generates a bit pattern required for the triggering of the rotary field of a stepping motor 4 depending upon the stepping pulse conveyed. This bit pattern is connected to the input of a stepping motor amplifier 5 which activates the corresponding windings in the stepping motor 4. A counter positioning device comprising two AND gates 7 and 8 is connected to the output of the Johnson counter 3 via a flip-flop 6 serving as a switching device. With this counter positioning device, the rotary field of the stepping motor 4, which is already running ahead due to the load angle, is set back when a pattern rest position is crossed for stopping of the stepping motor 4 when switch 11 is activated when printing is finished.

Although various minor modifications may be suggested by those versed in the art, it should be understood that we wish to embody within the scope of the patent warranted hereon, all such embodiments as reasonably and properly come within the scope of our contribution of the art.

We claim as our invention:

1. A shifting arrangement for the exact space positioning of a writing carriage for typewriters which moves position-by-position alongside a record holder according to a positioning pattern defining position points, comprising
   (a) a stepping motor having a rotary field and a plurality of angular positions;
   (b) a positioning pattern defining a plurality of positioning points spaced a predetermined distance, a specific number of angular positions of the stepping motor which serve as basic advance positions for the rotary field of the stepping motor during running thereof being assigned to said pattern positioning points; and
   (c) electronic device means for triggering the rotary field of the stepping motor and adjusting the stepping motor rotary field to the stepping motor basic advance position which corresponds with the pattern positioning point during running of the stepping motor for compensating a load angle of the stepping motor, said electronic device means including resetting means for resetting the stepping motor rotary field at stopping from a basic advance position to a pattern positioning point at which the stepping motor rests.

2. Arrangement in accordance with claim 1, characterized in that the electronic device means and resetting means comprise a counting device with a counter positioning device connectable via a switching device when a stop signal for the stepping motor is present.

3. Arrangement in accordance with claim 2, characterized in that the counting device is a shift register in which the output of a last stage is fed back in inverted fashion to the input of the first stage.

* * * * *

UNITED STATES PATENT AND TRADEMARK OFFICE
CERTIFICATE OF CORRECTION

PATENT NO. : 4,143,980
DATED : March 13, 1979
INVENTOR(S) : Giebler et al

It is certified that error appears in the above-identified patent and that said Letters Patent are hereby corrected as shown below:

IN THE ABSTRACT

Line 2, delete "teletype" and substitute --TELETYPE--.

IN THE SPECIFICATION

Col. 1, line 8, delete "tele-" and substitute --TELETYPE (a registered trademark)--.

Col. 1, line 12, delete "tele-" and substitute --TELETYPE--.

Signed and Sealed this

Eighth Day of January 1980

[SEAL]

Attest:

Attesting Officer

SIDNEY A. DIAMOND

Commissioner of Patents and Trademarks